(12) United States Patent
Kostal et al.

(10) Patent No.: US 7,500,097 B2
(45) Date of Patent: *Mar. 3, 2009

(54) EXTENDABLE DATA-DRIVEN SYSTEM AND METHOD FOR ISSUING CERTIFICATES

(75) Inventors: Gregory Kostal, Kirkland, WA (US); Muthukrishnan Paramasivam, Seattle, WA (US); Ravindra Nath Pandya, Clyde Hill, WA (US); Scott C. Cottrille, Sammamish, WA (US); Vasantha K Ravula, Sammamish, WA (US); Vladimir Yarmolenko, Duvall, WA (US); Charles F. Rose, III, Redmond, WA (US); Yuhui Zhong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

This patent is subject to a terminal disclaimer.

(21) Appl. No.: 11/069,803

(22) Filed: Feb. 28, 2005

(65) Prior Publication Data

US 2006/0195690 A1 Aug. 31, 2006

(51) Int. Cl.
*H04L 9/00* (2006.01)
*G06F 7/04* (2006.01)
*G06F 17/30* (2006.01)

(52) U.S. Cl. .............................. 713/156; 726/5; 726/27
(58) Field of Classification Search ................. 713/156
See application file for complete search history.

(56) References Cited

U.S. PATENT DOCUMENTS

| 6,430,688 | B1 * | 8/2002 | Kohl et al. .................. 713/156 |
| 6,505,193 | B1 | 1/2003 | Musgrave et al. .............. 707/3 |
| 6,675,296 | B1 | 1/2004 | Boeyen et al. ............. 713/156 |
| 6,816,965 | B1 | 11/2004 | Moore et al. ................ 713/158 |
| 2004/0003139 | A1 * | 1/2004 | Cottrille et al. ............ 709/331 |
| 2004/0148514 | A1 * | 7/2004 | Fee et al. .................... 713/200 |
| 2005/0148323 | A1 * | 7/2005 | Little et al. .............. 455/414.1 |

* cited by examiner

*Primary Examiner*—Longbit Chai
(74) *Attorney, Agent, or Firm*—Woodcock Washburn LLP

(57) ABSTRACT

An improved certificate issuing system may comprise a novel arrangement for expressing certificate issuing policy. The policy may be expressed in a human-readable policy expression language and stored for example in a file that is consumed by a certificate issuing system at runtime. The policy may thus be easily changed by altering the digital file. Certain techniques are also provided for extending the capabilities of the certificate issuing system so it may apply and enforce new policies.

19 Claims, 5 Drawing Sheets

EXTENDABLE DATA-DRIVEN SYSTEM AND METHOD FOR ISSUING CERTIFICATES

FIELD OF THE INVENTION

This invention relates to computing security, and more particularly to the use of digital certificates to authenticate a client to a server.

BACKGROUND OF THE INVENTION

A certificate is a document that attests to the truth of something or the ownership of something. In the world of computing, digital certificates serve a variety of functions. For example, a digital certificate may authenticate some entity by establishing that the entity is in fact what it claims to be. A digital certificate may also authorize an entity by establishing that the entity is entitled to access a restricted resource.

Certificates are very useful, and are at the present time experiencing increased use. Expression and enforcement of security policies is an increasingly important enterprise capability. The number of certificate formats is also proliferating. Some of the more popular certificate formats available today are the X.509, the Security Assertion Markup Language (SAML) security token, XrML 1.2, and MPEG-REL. Note that MPEG-REL has a number of variations and goes by a number of names, including XrML 2.x, MPEG ISO-REL, and ISO-REL. The acronym MPEG-REL, as used here, refers at least to all of these above-listed variations.

To illustrate the various functions and formats of the above exemplary certificates, X.509 certificates adhere to their own format and typically represent identity. SAML certificates adhere to their own XML schema and are widely used in federated identity solutions. XrML 1.2 and MPEG-REL (a.k.a. XrML 2.x) express use policy for a resource and adhere to their own XML schema.

Services and products exist today which produce and consume certificates. A problem arises, however, when a client that possesses a certificate in a first format encounters a server that consumes only certificates of a second format. At best, this may result in inefficiency as the client attempts to obtain an appropriately formatted certificate, or by requiring the client to determine beforehand which certificate format is required by the server. At worst, it results in an interoperability failure.

Another weakness of present certificate issuing systems is that it is difficult to modify the circumstances under which a certificate may issue, the "certificate issuing policy." In present systems, the policy is expressed as compiled algorithms in the certificate issuing system binary code or as a specifically modeled, "brittle" set of configuration parameters. Altering the enforcement policy requires recoding, recompiling and redeploying a new certificate issuing system binary. Thus, as a practical matter, certificate issuing policies are limited to those preconceived by certificate issuing system programmers. To change the policy, a certificate issuing system may have to be entirely recoded. This can take a product development team a significant amount of time and effort to accomplish.

Therefore, there is an unmet need in the industry to provide increased interoperability in certificate issuing as well as to facilitate changes to certificate issuing policies.

SUMMARY OF THE INVENTION

In consideration of the above-identified shortcomings of the art, the present invention provides an improved certificate issuing system and methods to be carried out by such an improved system.

The certificate issuing system provided herein may comprise a translating component for translating incoming certificates into a common format, and for translating generated certificates into any desired format. Thus the system may be described as format-agnostic.

The system may also comprise a novel arrangement for expressing certificate issuing policy. The policy may be expressed in a mark-up policy expression language and stored in a digital file that is consumed by a certificate issuing system at runtime. The policy may thus be easily changed by altering the policy expressed in the digital file. Certain techniques are also provided for extending the capabilities of a certificate issuing system so it can apply and enforce new issuing policies.

Other advantages and features of the invention are described below.

BRIEF DESCRIPTION OF THE DRAWINGS

The systems and methods for issuing certificates in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The apparatus and methods set forth herein generally pertain to issuing digital certificates. The term "certificate" is used herein as a short form for "digital certificate." As stated in the background, a certificate is a document that attests to the truth of something or the ownership of something. The term "attest" implies at least two entities which are involved in the use of a certificate. A first entity, which will be referred to herein as the client, uses a certificate to attest something to a second entity, the server. The client may use a certificate issued by a trusted third party issuer. The "something" that is attested may be anything. Typically, the client's identity and/or a client's authorization to obtain or access some resource may be attested, but anything else may also be attested.

A third entity may also play a role in the use of digital certificates. This third entity is a certificate issuing system. The term "certificate issuing system" may also be referred to herein and in the industry as a "certificate issuing service," and may be referred to for convenience simply by the term "issuer." Certificate issuing systems determine whether a particular client is entitled to a certificate. If so, the client is issued a certificate, and may then use the certificate to attest to a server.

While a client and server may be thought of as two complete computing devices, each comprising hard drive, bus, system memory, and so forth, those of skill in the art presently understand these terms in a broader sense. Client and server may in fact be two entities that exist within a single computing device, or across multiple computers in a distributed computing arrangement. In this regard, a certificate issuing system may also exist within a computer that houses one or more clients and one or more server entities, and may also exist across multiple devices.

Figure 1:
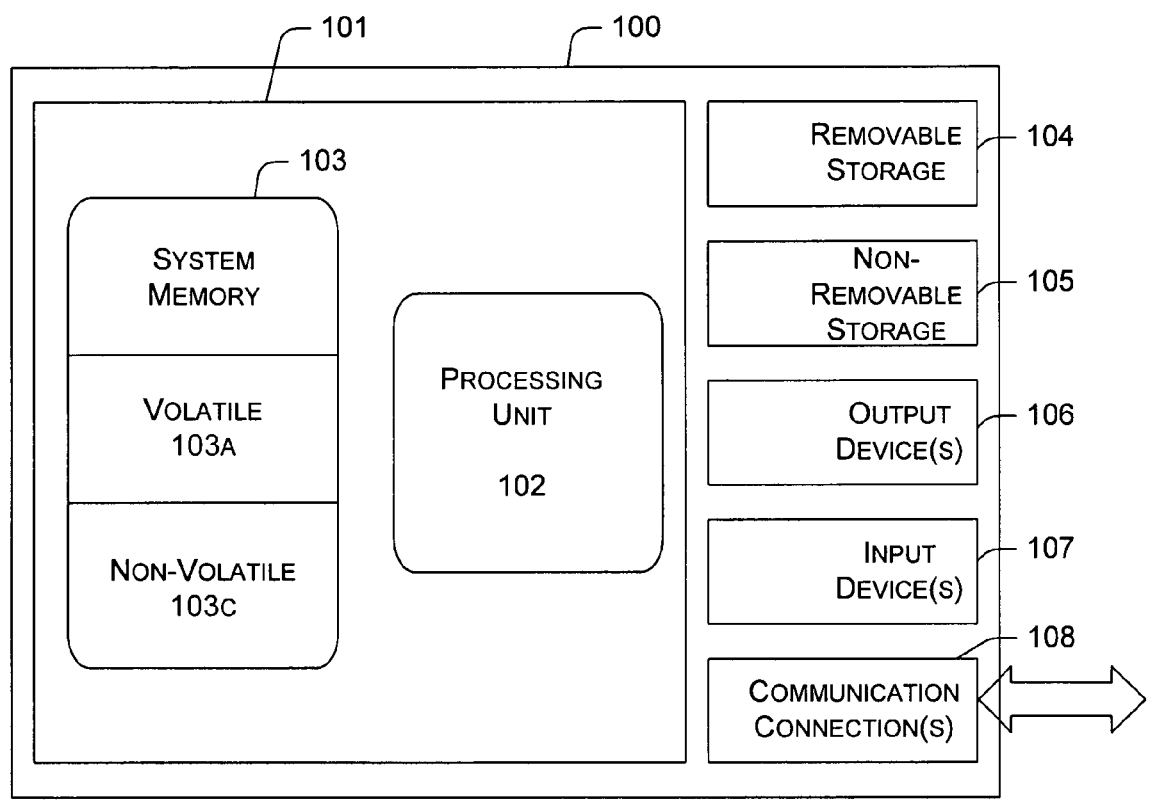
FIG. 1 is a block diagram broadly representing the basic features of an exemplary computing device suitable for use in conjunction with various aspects of the invention. The computing device may access instructions on computer readable media, and execute those instructions in an appropriate sequence for performing the functions of a certificate issuing system.

With reference to FIG. 1, an exemplary computing device 100 suitable for use in connection with the certificate issuing system is broadly described. In its most basic configuration, device 100 typically includes a processing unit 102 and memory 103. Depending on the exact configuration and type of computing device, memory 103 may be volatile 103A (such as RAM), non-volatile 103B (such as ROM, flash memory, etc.) or some combination of the two. Additionally, device 100 may also have mass storage (removable 104 and/or non-removable 105) such as magnetic or optical disks or tape. Similarly, device 100 may comprise input devices 107 such as a keyboard and mouse, and/or output devices 106 such as a display that presents a GUI as a graphical aid accessing the functions of the computing device 100. Other aspects of device 100 may include communication connections 108 to other devices, computers, networks, servers, and so forth using wired or wireless media.

Volatile memory 103A, non-volatile memory 103B, removable mass storage 104 and non-removable mass storage 105 are examples of computer readable media. Computer readable media may comprise communication media as well as computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computer storage media may be implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium.

The invention may be implemented, at least in part, via computer-executable instructions, such as program modules, being executed by a computer 100. Generally, program modules include routines, programs, objects, components, data structures, etc. that perform particular tasks or implement particular abstract data types.

Computer executable instructions are generally embodied as digital information available to computer 100 on some form of computer readable media. In FIG. 1, for example, system memory 103 may store an operating system and application programs as well as other program modules and program data. Applications and such may be bundled with an operating system, or may exist separately and draw upon operating system services to function.

It should be understood that while embodiments of the invention described herein may be software implementations, the various techniques described herein may also be implemented by replacing hardware components for at least some program modules. Thus, while the methods and apparatus of the present invention, or certain aspects or portions thereof, may take the form of program code in a high level procedural or object oriented programming language, the program(s) can also be implemented in assembly or machine language, if desired. In any case, the language may be a compiled or interpreted language, and combined with hardware implementations.

The invention is operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
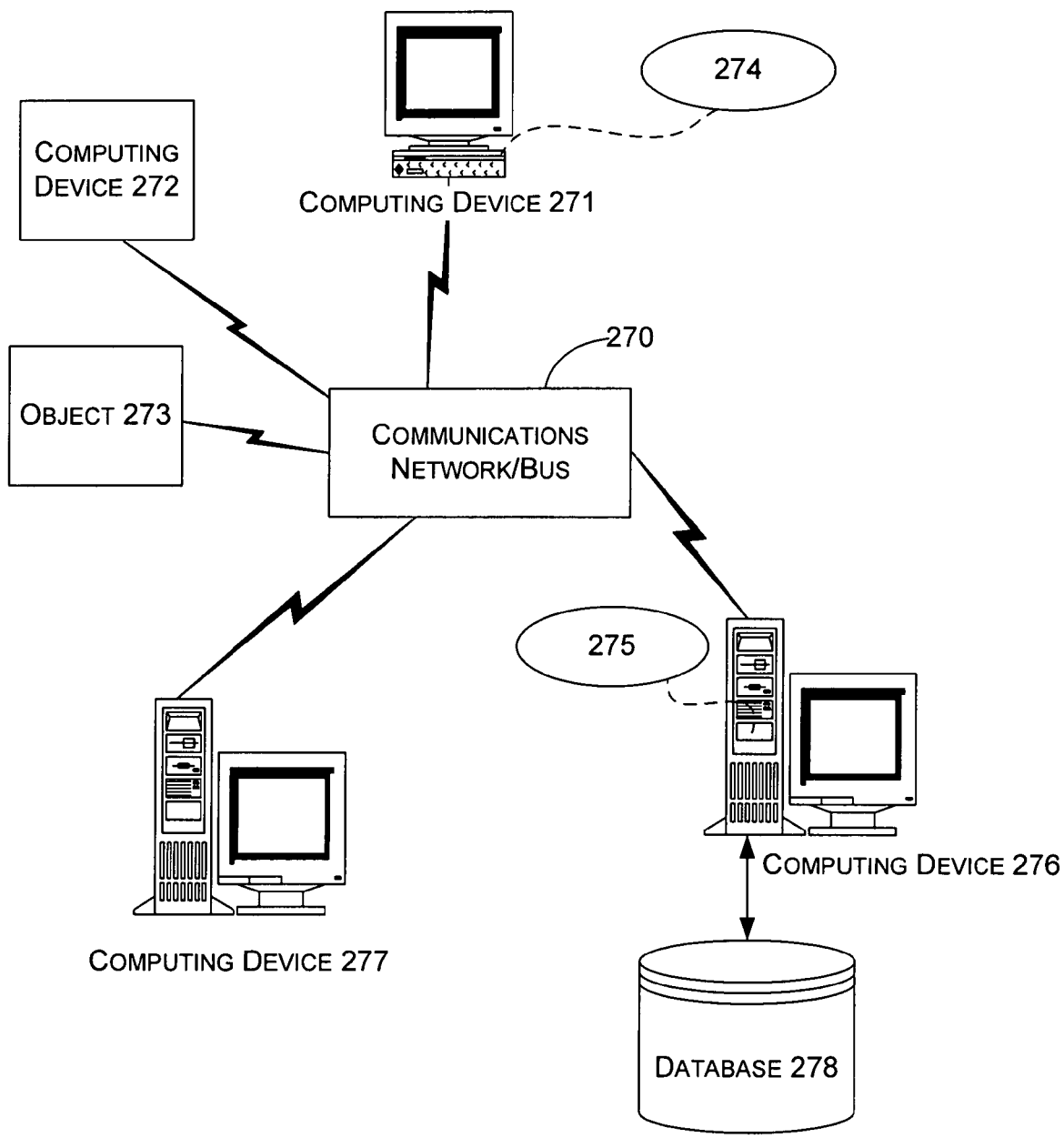
FIG. 2 illustrates an exemplary networked computing environment in which a certificate issuing system may operate. The issuer may reside for example on device 271. A client process at device 277 may request a certificate from the issuer at 271, and subsequently use the certificate in communications with a server process at device 275.

FIG. 2 provides an exemplary networked computing environment. The network comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270.

Devices on a network communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other.

The network address can be referred to as a URL address. Communication can be provided over a communications medium, e.g., client(s) and server(s) may be coupled to one another via TCP/IP connection(s) for high-capacity communication.

The network may itself comprise other computing entities that provide services to the system of FIG. 2, and may itself represent multiple interconnected networks. Each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

The "client" is a member of a class or group that uses the services of another class or group to which it is not related. In computing, a client may be a process, i.e., roughly a set of instructions or tasks, that requests a service provided by another program. Such service may be, for example, the issuing of a certificate by a certificate issuing system. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local net-work, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Embodiments of the invention may thus address a situation where a client entity which requires a certificate resides in a first computing device in a network, e.g., 277. A server entity which may have some resource needed by the client entity may reside in a second computing device, e.g., 275. A certificate issuing system may reside in yet a third computing device, e.g., 271.

The client at device 277 may determine that it requires a certificate to attest to some client credential(s) for the server at device 275. The client at 277 thus submits a request across the network bus 270 to the issuer at 271. The request may itself comprise one or more previously issued certificates. The issuer at 271 proceeds to determine whether the client is entitled to the certificate it requested. The issuer at 271 accomplishes this by applying a certificate issuing policy. If the client at 277 has the credentials required by the policy, then the requested certificate may be issued to the client at 277 by the issuer at 271. The client may then use the issued certificate, along with any number of other certificates, in its communications with the server at 275.

Figure 3:
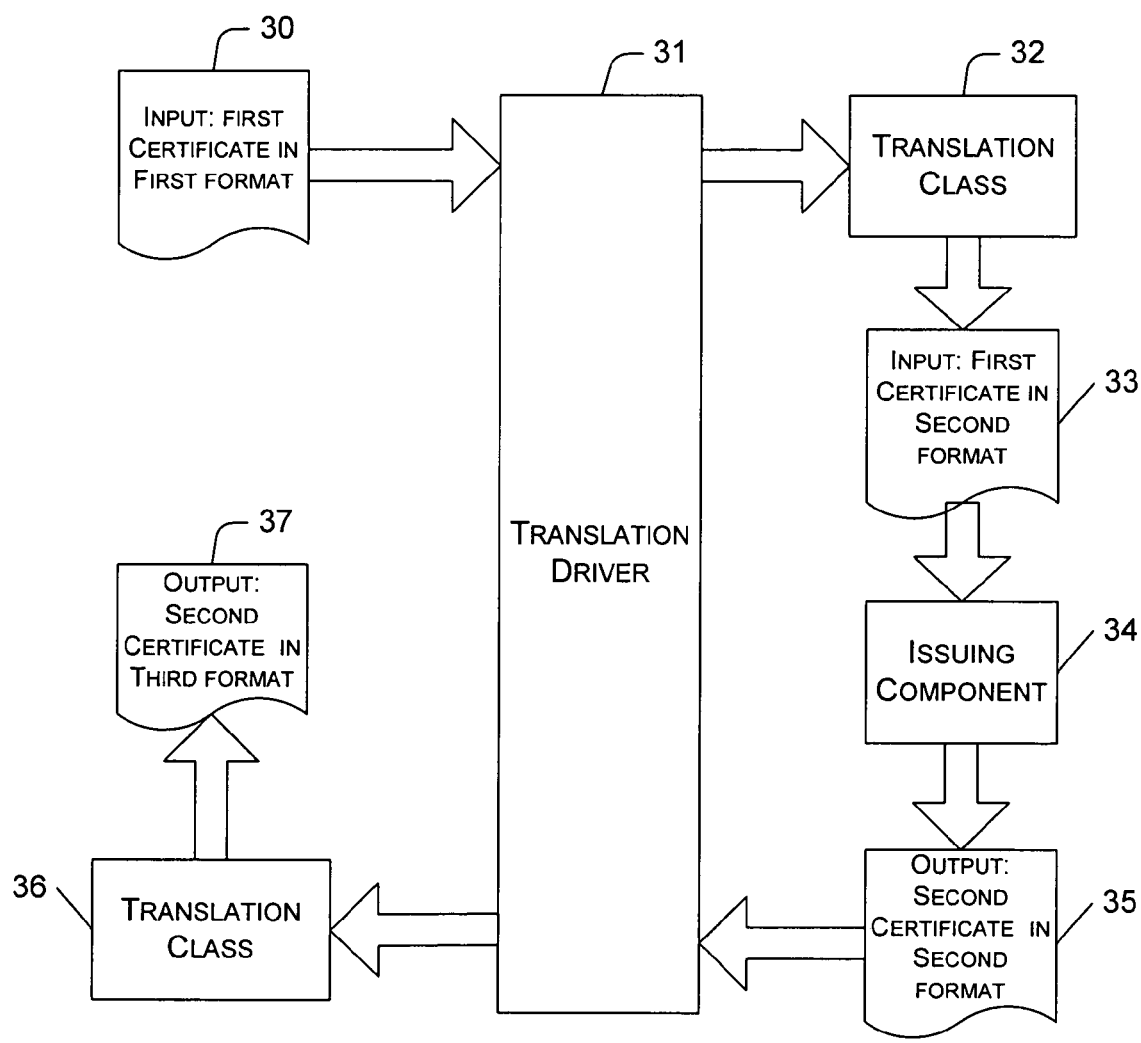
FIG. 3 illustrates a translation component portion of a certificate issuing system. The translation component serves to transfer incoming certificates of multiple formats into a single common format. Certificates generated by the issuing component 34 in the common format for delivery to a client may be translated into any format as necessary.

FIG. 3 illustrates a translation component portion of a certificate issuing system. The issuing component 34 is illustrated in greater detail in FIGS. 4 and 5. In various embodiments of the invention, the translation component can be substantially the first component to receive an incoming certificate, and also substantially the last component to manipulate a certificate before it is delivered to a client. In other embodiments, the translation component may be used at any place in a certificate issuing system, as necessary.

When a request for a certificate arrives at a certificate issuing system, any accompanying certificates, such as a first certificate in a first format 30, can be routed to a translation driver 31. Translation driver 31 can operate to translate certificates to and from a common format used for operations of the issuing component 34. Thus, a first certificate in a first format 30 may be translated into a second format. The result of such a translation is the first certificate in the second format 33.

Conversely, when a certificate is issued by the issuing component 34, it can be translated from the format generated by the issuing component 34 into any format needed by a client. Thus, a second certificate in a second format 35 may be translated into a third format. The result of such a translation is the second certificate in the third format 37. This third format may be any certificate format, including the format of one or more certificates that arrived with a client request for a certificate, e.g., 30.

The certificate translation component is optimally designed to translate as many certificate formats as possible. In this regard, it may translate X.509 certificates, the Security Assertion Markup Language (SAML) security token certificates, XrML 1.2 certificates, and MPEG-REL certificates, to name a few of the more popular exemplary certificate formats. However, it may not always be economically feasible to design translation apparatus for each and every possible certificate type. The invention is not limited to the number or particular format of certificate types that are capable of translation by the translation component.

Because new certificate formats are continuously generated in the art, it is beneficial to design the translation component such that it can be extended to accommodate additional certificate formats. The driver 31 can manage the conversion of the various elements of a particular certificate 30 into a common-format certificate 33 based on the instructions provided by one or more classes, e.g., 32. The particular arrangement of FIG. 3 is advantageous because it allows for expandability of the translation component to accommodate new certificate formats. However, the driver 31 and classes such as 32, 36 arrangement in FIG. 3 is exemplary only, and those of skill in the art will recognize that a variety of arrangements are workable to accomplish conversion of certificates from one format to another.

In FIG. 3, the common format is referred to as a second format. Selection of a common format involves determining a format that is as robust as possible to accommodate for all of the various types of information that may be contained in incoming certificates of a variety of formats. While any certificate may be selected to serve as the common format, including the X.509 format, the Security Assertion Markup Language (SAML) security token format, XrML 1.2 certificates, and MPEG-REL format, to name a few of the more popular exemplary certificate formats, the MPEG-REL has been selected for implementations of the invention and is presently considered advantageous for this purpose.

Another advantage of the use of a translation component stems from the fact that each of the various certificate formats express policy in its own way. A barrier to interoperability of present certificate issuers is format incompatibility. To consume any particular format requires custom algorithms that permeate an issuer. We can not expect to convince all existing producers of certificates to adopt a common format, therefore we must assume these formats will continue to exist for the long-term. A technique for mapping or translating disparate certificate formats and their semantics into a common language thus reduces the systemic impact of the multiple formats, and is a step in the direction of solving the problem of certificate interoperability.

A correct translation should satisfy both syntax and semantic requirements. The former requires that a translated certificate has valid format. The latter requires the translated certificate conveys the same information as the original certificate. However, there are cases when the source format has more information than the target format which makes information loss in translation unavoidable. Thus a goal for implementation of the invention is to ensure the information is translated correctly while preserving other information at best effort.

The certification translation algorithms 32, 26 can be classified into two categories based on their functionality:

Syntax level: Mapping between constructs

Semantic level: Translation between certificates

In one embodiment, this collection of algorithms may be implemented as a set of classes. The set of classes is depicted in FIG. 3 as a certificate translation driver 31. Embodiments of a translation driver 31 may comprise three components: a driver class, a certification translation classes and configuration classes. The driver class may perform the overall coordination of the translation process and calls the translation classes. The translation classes may perform the actual translation process, and the configuration classes may contain necessary configuration data for the translation driver 31 to operate.

The following brief example is included to demonstrate an exemplary operation of a translation from a first certificate format, XrML 1.2, to a second certificate format, XrML 2.0. As will be appreciated by those of skill in the art, the first version of the MICROSOFT® Rights Management Server product used certificates in XrML 1.2 format to do its policy evaluation. Future scheduled releases of the Rights Management Server product, however, will use certificates in XrML 2.0 format. Thus, the following provides a good example both of the operation of a translation component, and of the increasing need for the invention provided herein. The situation is as follows: a client sends a certificate request to a hypothetical Rights Management Server product that implements the invention. The request itself contains a certificate, e.g., certificate 30 in FIG. 3, in XrML 1.2 format. XrML 2.0 is the common format used by the certificate issuing system 34.

To receive and understand certificates in both formats, a set of translation classes is implemented. Assuming this is accomplished, upon receiving a request from the client with a certificate 30 in XrML 1.2 format, the translation driver 31 creates a corresponding certificate translation class 32, passes configuration data to it, and invokes translation method. The certificate translation class 32 validates the signature and validity interval of the XrML 1.2 certificate 30, translates it into an XrML 2.0 counterpart 33, and returns the translation-specific information to the translation driver 31. The translation driver 31 then calls the Rights Management Server 34 using the certificate 33 in XrML 2.0 format. Rights Management Server 34, in this example, natively understands XrML 2.0 certificates and performs the certificate issuing operations and sends the result back to the translation driver 31. After receiving a XrML 2.0 certificate 35 issued by the Rights Management Server 34, the translation driver 31 creates a certificate translation class 36 that translates the XrML 2.0 certificate 35 to an XrML 1.2 counterpart 37.

Figure 4:
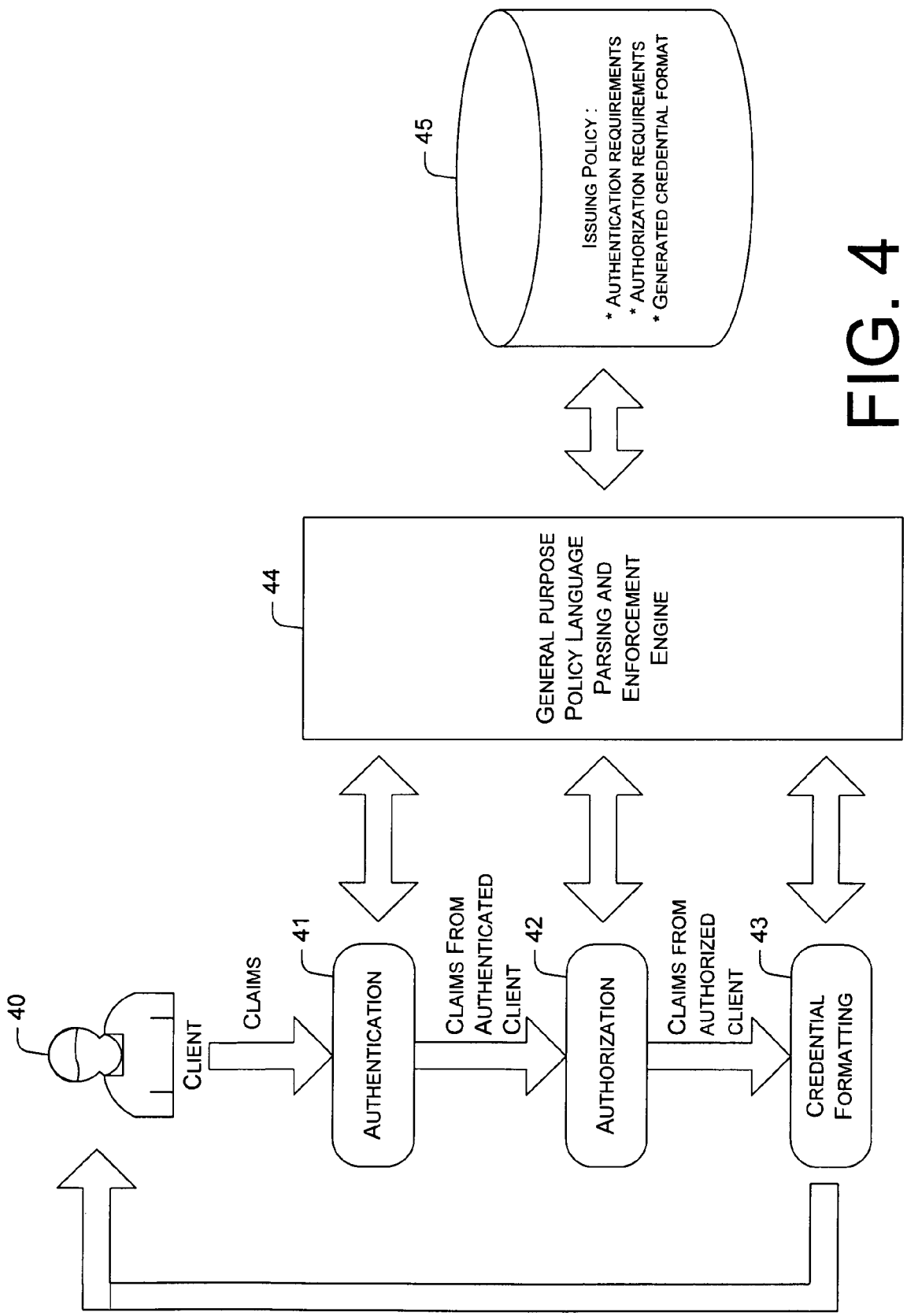
FIG. 4 illustrates an issuing component portion of a certificate issuing system. Authentication 41, authorization 42, and credential formatting 43 are exemplary functions that may be performed by the issuing component. As part of performing these functions, a general purpose policy language parsing and enforcement engine 44 can apply a certificate issuing policy 45. The issuing component is thus data-driven in the sense that the policy to enforce is not expressed in the engine 44, but rather in the issuing policy 45 that is consumed by the engine 44 at runtime.

FIG. 4 illustrates an issuing component portion of a certificate issuing system. Once a translation is completed as described with reference to FIG. 3, a translated certificate representation can be processed using the various functional components illustrated in FIG. 4. The translation component is not illustrated in FIG. 4 or FIG. 5 to avoid obscuring the figures. For an exemplary integration of the various components, refer to FIG. 3.

A client 40 sends one or more claims along with its request for a certificate. A claim is any assertion made by an entity to be used in determining whether the entity is entitled to a certificate. If a claim is verified to be true, then the client entity 40 has demonstrated that it has a credential. One or more credentials may ultimately be required by a certificate issuing policy prior to issuing a certificate to the client 40.

Authentication 41, authorization 42, and credential formatting 43 are exemplary functions that may be performed by the issuing component. As illustrated in FIG. 4, these functions may be performed serially in the order of authentication 41, then authorization 42, then credential formatting 43. This order is not required in all embodiments. Depending on what is needed to satisfy a client request, 41, 42, and 43 may each be performed independently, some sub-combination may be performed, or one or more of such functions may be performed along with some other function not illustrated in FIG. 4.

When 41, 42, and 43 are performed serially, the authentication process 41 may first determine whether the client 40 who makes claims to support a certificate request is in fact the entity that the client 40 claims to be. If this is proved, then the authorization process 42 may determine whether the client is authorized to receive a requested certificate. Alternatively, the authorization process 42 may simply determine an authorization level of the client 40 and record that in the certificate that is created. Finally, when a certificate is generated on behalf of the client 40, the client 40 credentials listed in the certificate may be formatted by 43 within a generated certificate.

As part of performing the authentication 41, authorization 42, and credential formatting 43 functions, a general purpose policy language parsing and enforcement engine 44 can apply a certificate issuing policy 45. The issuing component is data-driven in the sense that the policy to enforce is not expressed in the engine 44, but rather in the issuing policy 45 that is consumed by the engine 44 at runtime.

While prior art certificate issuing systems apply and enforce a policy when generating a certificate, this policy is expressed in prior art issuers as compiled algorithms in the certificate issuing system binary code or as a specifically modeled, "brittle" set of configuration parameters. As a result, altering the enforcement policy in prior art issuers requires recoding, recompiling and redeploying a new issuer binary. In other words, the delivered issuer is limited to enforcing the set of policies preconceived by the certificate issuing system authors.

The certificate issuing engine 44 should include little or no preconceived policy structure. Instead, the engine 44 should contain a meta-data driven policy enforcement engine that honors the specific policy data from 45 which it encounters at runtime. This policy data 45 is expressed using a policy expression language designed for use by the engine 44.

Engine 44 preferably operates on a single, common policy expression language and makes authorization decisions based on available policies and data in 45. By performing this processing on a homogeneous policy expression language format, the engine 44 logic is simpler, more efficient, and can be optimized for the chosen policy expression language. By being data-driven, the engine 44 can evaluate a broad range of expressed policies without having to change the engine 44 logic to accommodate new policies, semantics or structures. Engine 44 as illustrated in the figures comprises both the functional components for parsing and enforcing policy 45, and the functional components for generating a certificate. The form of the certificates generated by engine 44 may be governed by policy 45 in addition to the other aspects of an issuing policy.

The policy expression language used to express policy 45 may take any of a wide variety of forms. The language used may be a mark-up language such as the Extensible Markup Language (XML), Hyper Text Markup Language (HTML), or some other mark-up language. As will be appreciated by those of skill, a set of human readable words and markings can be combined in such languages to exactly specify desired operations. A machine process such as engine 44 can be configured to consume files in this form at runtime and carry out the desired operations. Any policy expression language that is designed for use with the invention should be robust, extensible and flexible to accommodate for changes in policy and addition of language semantics as needed. Markup refers to the sequence of characters or other symbols that are inserted at certain places in a text or word processing file to describe the document's logical structure. The markup indicators are often called "tags." Markup can be inserted by the document creator directly by typing the symbols in or by using an editor and selecting prepackaged markup symbols (to save keystrokes).

XML is "extensible" because, unlike HTML, the markup symbols are unlimited and self-defining. XML is actually a simpler and easier-to-use subset of the Standard Generalized Markup Language (SGML), the standard for how to create a document structure. It is expected that HTML and XML will be used together in many Web applications. XML markup, for example, may appear within an HTML page. In this regard, the specified syntax used for the present invention may include combinations of mark-up languages.

In FIG. 4, the engine 44 applies a policy 45 expressed in the policy expression language and stored in digital format. Policy 45 may be manifested as one or more digital files, or as a database, or as any other stored data format. Those of skill will acknowledge that a digital file can be converted into any form: the aspects thereof may be inserted into fields of a database, or the file may be converted from one format to another. Thus, while it is contemplated that at least initially a policy is optimally created by a human in a digital format that can used by text editors, such as a file in common text (.txt) or document (.doc) format, such an initial digital file may be converted into any number of forms prior to storage in 45. Regardless of the format of data, the issuing policy 45 expressed therein must be satisfied by client 40 if client 40 is to be entitled to a requested certificate. Policy 45 may also govern the format of generated certificates, i.e., it may comprise policy for credential formatting.

Issuing policy 45 is preferably comprised of at least the following:

Client authentication requirements

Client authorization requirements

Certificate issuing service authorization requirements

To draw once again on the popular MICROSOFT WINDOWS® Rights Management Server issuer for an example of a certificate issuing system, those of skill will acknowledge that this issuer can be used to implement "Information Rights Management" features for protected documents and email, for example the Information Rights Management features in MICROSOFT® Office 2003. As part of the solution, presently available versions of the WINDOWS® Rights Management Server deploy an issuer that includes a preconceived, hard-coded, brittle issuing policy definition. Only a fixed, well known set of issuing policies can be enforced—for example:

What are the trusted applications?

What users are specifically excluded?

What entities are trusted to issue user identification credentials?

What version(s) of the Rights Management software must the user run on their desktop?

In contrast, presently available versions of the WINDOWS® Rights Management Server cannot enforce new issuing policies, such as:

What are the trusted applications for a user's enterprise division?

What class of users are specifically excluded (e.g., all those whose network password will expire in less than 7 days)?

What specific credentials is the certificate issuing system trusted to generate?

By restructuring presently available versions of WINDOWS® Rights Management certificate issuing service to implement the systems and methods of the invention herein, the product could understand and enforce policies in a flexible policy expression language, and the new issuing policies listed above, as well as any other conceivable issuing policy, could be accommodated without altering the deployed issuer. Only the expressed policy in 45 would need to be altered.

A certificate issuing system can publish its issuing policy 45 along with the set of available issued certificate formats in order to facilitate client 40 discovery processes, forensic analysis, etc.

Figure 5:
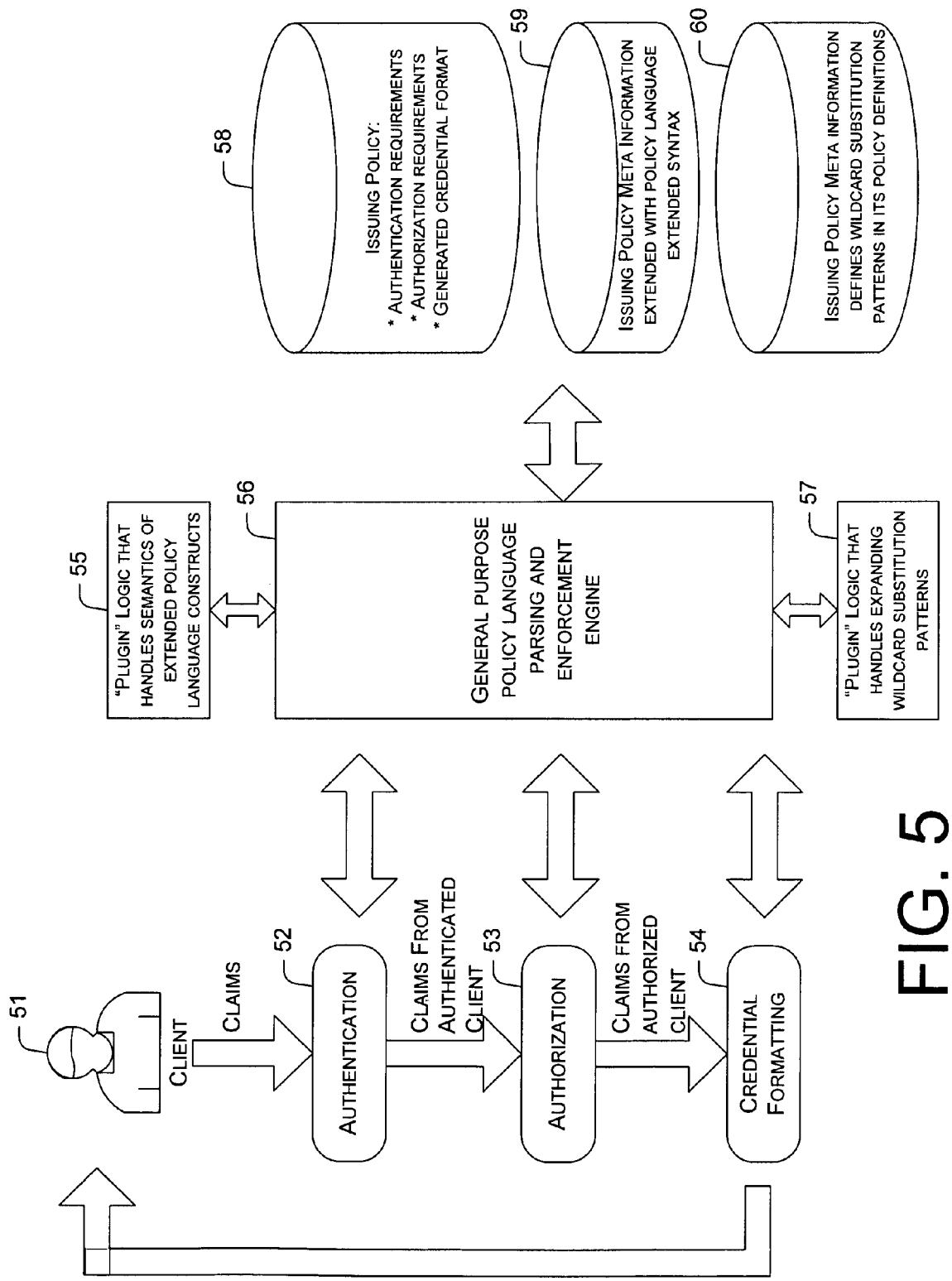
FIG. 5 illustrates systems and methods for extending the issuing component to apply and enforce new issuing policies that are not natively supported by the policy expression language and/or by the policy language parsing and enforcement engine 56. When the policy language syntax is extended, e.g., in 59, plug-in logic that handles semantics of extended policy language constructs 55 can be added to the enforcement engine 56. When native policy language wildcards are used, plug-in logic that handles expanding wildcard substitution patterns 57 can be added to the enforcement engine 56.

FIG. 5 illustrates systems and methods for extending the issuing component to apply and enforce new issuing policies that are not natively supported by the policy expression language and/or by the policy language parsing and enforcement engine 56. When the policy expression language syntax is extended, e.g., by combining additional data 59 with the issuing policy data 58, plug-in logic 55 that handles semantics of extended policy expression language constructs can be added to the enforcement engine 56. When native policy language wildcards are used, e.g., by adding wildcard substitution pattern data 60 to issuing policy data 58, plug-in logic 57 that handles expanding wildcard substitution patterns 60 can be added to the enforcement engine 56.

The data-driven policy evaluation engine 56 may be designed to anticipate semantics of certificates that it does not understand or is not intended to process. An extensibility mechanism for these certificate semantics may be present whereby custom logic such as 55 or 57 for such a certificate is interrogated to either provide a value, perform custom processing, or otherwise handle the unknown semantics in a well-defined manner. The results of this processing may feed back into the policy evaluation engine 56 and possibly influence the final results of a determination of entitlement to a certificate.

There are at least two mechanisms contemplated herein for extending the issuing component. First, by building atop an extensible policy expression language (e.g., one that leverages the extensibility of XML) and providing the appropriate plug-in mechanisms, such as 55, a certificate issuing system can support custom extensibility to its customers. Second, by including the concept of wildcard substitution patterns in its policy expression language and providing the appropriate plug-in mechanisms, such as 57, an issuer can support custom extensibility for its customers.

Beginning with the first of the aforementioned options for extending the issuing component, the policy expression language syntax is extensible in preferred embodiments. A policy enforcement engine 56 can be preconfigured to "know" how to honor the semantic meaning of the original aspects of the policy expression language. However, if the semantics of the policy expression language are extended, the engine 56 must also be extended.

Extensions of the policy expression language may be set forth in digital data 59 that is accessible by the engine 56. Such extensions 59 may be manifested as one or more files, or as a database, or as any other stored data format. While extensions are optimally created by a human in a format that is used by text editors, such as a file in common text (.txt) or document (.doc) format, such an initial file may be converted into any number of forms prior to storage. Regardless of the format of data, the issuing policy extensions 59 expressed therein may be accessed by custom logic 55 to apply and enforce policies expressed using the extended policy expression syntax 59.

To accomplish this, the engine 56 can be configured to allow extended logic (aka "plug-ins"), such as 55, to be registered. Plug-in 55 may provide the semantic backing for any new syntactical extensions 59 of the policy expression language. Unanticipated customer requirements can thus be addressed without overhauling the engine 56 itself or the originally used syntax of the policy expression language. The policy expression language is ideally designed to syntactically support extension.

An example may help clarify extensibility of engine 55 using plug-in 55. Suppose a certificate issuing system ships with an XML policy expression language that contains an element that represents a user's PKI identity . . . perhaps it looks like the following:

```
<user>
<name>George Washington</name>
<publickey>1234567890</publickey>
</user>
```

A certificate issuing system customer might want to extend the notion of a user to include a user's enterprise Lightweight Directory Access Protocol (LDAP) identity. A policy language extension to include LDAP syntax could be supported with code that performs an LDAP query on a certificate issuing system database when required. In this case, the extended policy language construct might look like the following:

```
<user>
<name>George Washington</name>
<publickey>1234567890</publickey>
<extension:ldapid>georgewashington</extension:ldapid>
</user>
```

Additionally, the code that verified a user with an LDAP query, namely plug-in 55, would be compiled and registered with the certificate issuing system. This plug-in 55 would be invoked by the engine 56 when it encountered the extended policy expression language syntax.

Turning now to the second option for extending the issuing component, the policy expression language that is used may include wildcard substitution parameters. Wildcard substitution patterns may be set forth in an original issuing policy 58, or may be added to the policy by making additional data 60 available to supplement the original policy 58.

Wildcard substitution patterns 60 may be manifested as one or more files, or as a database, or as any other stored data format. While initial substitution patterns are optimally created by a human in a format that is used by text editors, such as a file in common text (.txt) or document (.doc) format, such an initial file may be converted into any number of forms prior to storage in 60. Regardless of the format of data, wildcard substitution patterns 60 expressed therein may be accessed by custom logic 57 to apply and enforce wildcards in a fashion dictated by the custom logic 57.

If the policy expression language includes wildcard definitions 60 within its syntax and the engine 56 provides a mechanism to register custom logic 57 to select a particular desired value, then this provides yet another avenue of extensibility to the certificate issuing system.

Again, an example may help clarify. An exemplary certificate issuing system may contain policy that defines the format of issued certificates. For example, the service may contain a certificate issuing policy that states that the service may issue "trusted employee certificates" to a client. Since the issuer must respond to a dynamic universe of clients, the wildcard certificate issuing policy might be structured as:

The certificate issuing system can issue the "trusted employee certificate" to any client it deems appropriate.

The certificate issuing system owner can then define and register logic, e.g., 57, that fills in the specifics of which clients to "deem appropriate." The logic 57 can determine which clients should be issued the "trusted employee certificate" during a particular service invocation. This logic 57 can be invoked by the certificate issuing system when it encounters the more general wildcard definition clause in the credential issuing policy.

In light of the diverse computing environments that may be built according to the general frameworks provided in FIG. 1 and 2, the systems and methods provided herein cannot be construed as limited in any way to a particular computing architecture. Instead, the present invention should not be limited to any single embodiment, but rather should be construed in breadth and scope in accordance with the appended claims.

What is claimed:

1. A digital certificate issuing system for generating a digital certificate in response to a client request, comprising:
a processor;
a certificate translation component that translates a first certificate accompanying an incoming certificate request into a common format, wherein said certificate translation component is equipped to translate certificates of a plurality of differing certificate formats into said common format;
a certificate issuing component that receives from said certificate translation component said first certificate accompanying said incoming certificate request in said common format;
said certificate issuing component configured to apply a certificate issuing policy to determine whether to grant said incoming certificate request, wherein said certificate issuing policy is stored in a digital file comprising certificate issuing policy requirements including at least one client authentication requirement, at least one client authorization requirement, and at least one credential formatting requirement, wherein said certificate issuing policy requirements are expressed according to a specified syntax in a mark-up language, and wherein said specified syntax can express a plurality of requirements beyond said certificate issuing policy requirements;
said certificate issuing component comprising a policy enforcement engine comprising instructions executable by said processor, said policy enforcement engine configured to enforce that the client meets said at least one client authentication requirement, said at least one client authorization requirement, and said at least one credential formatting requirement, said certificate issuing component issuing a second certificate in said common format if the client meets said at least one client authentication requirement, said at least one client authorization requirement, and said at least one credential formatting requirement; and
said certificate translation component configured to translate said second certificate issued by said certificate issuing component from said common format into a format requested in said incoming certificate request.

2. The digital certificate issuing system of claim 1, wherein said common format is the MPEG-REL format.

3. The digital certificate issuing system of claim 1, wherein the markup language is the Extensible Markup Language (XML).

4. The digital certificate issuing system of claim 1, wherein the policy enforcement engine comprises a mechanism to call custom logic to enforce that the client meets a requirement in said digital file that is not expressed in said specified syntax.

5. The digital certificate issuing system of claim 1, wherein the policy enforcement engine comprises a mechanism to call custom logic to enforce that the client meets a requirement in said digital file.

6. The digital certificate issuing system of claim 1, further comprising a component for delivering a translated second certificate to the client.

7. A computer readable storage medium bearing computer-executable instructions for generating a digital certificate in response to a client request, comprising instructions for:
    translating a first certificate accompanying an incoming certificate request into a common format, wherein said first certificate is in one of a plurality of differing formats;
    reading a digital file comprising at least one certificate issuing policy, said at least one certificate issuing policy comprising at least one certificate issuing policy requirement, wherein said at least one certificate issuing policy requirement comprise at least one client authentication requirement, at least one client authorization requirement, and at least one credential formatting requirement, wherein said at least one certificate issuing policy requirement is expressed according to a specified syntax in a mark-up language, and wherein said specified syntax can express a plurality of requirements beyond said at least one certificate issuing policy requirement;
    applying said certificate issuing policy to determine whether to grant said certificate request;
    enforcing that the client meets any of a variety of requirements in said digital file, including the at least one certificate issuing policy requirement and the plurality of requirements beyond said at least one requirement;
    generating a second certificate in said common format if the client meets any of the variety of requirements in said digital file; and
    translating said second certificate from said common format into a format requested in said incoming certificate request.

8. The computer readable storage medium of claim 7, wherein said instructions for generating a digital certificate produce digital certificates in the MPEG-REL format.

9. The computer readable storage medium of claim 7, wherein the markup language is the Extensible Markup Language (XML).

10. The computer readable storage medium of claim 7, wherein the instructions for enforcing comprise a instructions to call custom logic to enforce that the client meets a requirement in said digital file that is not expressed in said specified syntax.

11. The computer readable storage medium of claim 7, wherein the instructions for enforcing comprise instructions to call custom logic to enforce that the client meets a requirement in said digital file.

12. The computer readable medium of claim 7, further comprising instructions for delivering a translated second certificate to the client.

13. The computer readable storage medium of claim 7, further comprising instructions for translating the first certificate that accompanies said client request from a first format into a second format.

14. The computer readable storage medium of claim 7, wherein the digital file further comprises a digital certificate layout requirement, and wherein the instructions for generating a digital the second certificate generate said second-certificate according to said digital certificate layout requirement.

15. The computer readable storage medium of claim 7, wherein said at least one certificate issuing policy requirement and said plurality of requirements beyond said at least one certificate issuing policy requirement comprise at least a client authentication requirement, a client authorization requirement, and a certificate issuing service authorization requirement.

16. A method for generating a digital certificate in response to a client request, comprising:
    translating a first certificate accompanying an incoming certificate request into a common format, wherein said certificate is in one of a plurality of differing formats:
    reading a digital file comprising at least one certificate issuing policy, said at least one certificate issuing policy comprising at least one certificate issuing policy requirement, wherein said at least one certificate issuing policy requirement comprise at least one client authentication requirement, at least one client authorization requirement, and at least one credential formatting requirement, wherein said at least one certificate issuing policy requirement is expressed according to a specified syntax in a mark-up language, and wherein said specified syntax can express a plurality of requirements beyond said at least one certificate issuing policy requirement;
    applying said certificate issuing policy to determine whether to grant said certificate request;
    enforcing that the client meets any of a variety of requirements in said digital file, including the at least one certificate issuing policy requirement and the plurality of requirements beyond said at least one requirement;
    generating a second certificate in said common format if the client meets any of the variety of requirements in said digital file; and
    translating said second certificate from said common format into a format requested in said incoming certificate request.

17. The method of claim 16, wherein said enforcing comprises calling custom logic to enforce that the client meets a requirement in said digital file that is not expressed in said specified syntax.

18. The method of claim 16, wherein said enforcing comprises calling custom logic, and wherein said custom logic enforces that the client meets a requirement in said digital file.

19. The method of claim 17, further comprising translating the first certificate that accompanies said client request from a first format into a second format.

\* \* \* \* \*